US008655984B2

(12) United States Patent
Garcia-Martin et al.

(10) Patent No.: US 8,655,984 B2
(45) Date of Patent: Feb. 18, 2014

(54) CONTENT AGGREGATION SERVICE FOR MOBILE ENVIRONMENT

(75) Inventors: Miguel An. Garcia-Martin, Helsinki (FI); Janne K. Suotula, Espoo (FI); Juha Louhisuo, Helsinki (FI)

(73) Assignee: Vringo Infrastructure Inc., New York, NY (US)

(*) Notice: Subject to any disclaimer, the term of this patent is extended or adjusted under 35 U.S.C. 154(b) by 1037 days.

(21) Appl. No.: 11/389,026

(22) Filed: Mar. 27, 2006

(65) Prior Publication Data

US 2007/0143502 A1    Jun. 21, 2007

(30) Foreign Application Priority Data

Dec. 21, 2005    (EP) .................................. 05 028 048

(51) Int. Cl.
*G06F 15/16*    (2006.01)

(52) U.S. Cl.
USPC ............ 709/218; 709/202; 709/207; 709/236

(58) Field of Classification Search
USPC ................. 709/217–219, 223–229, 230–233; 725/32–36, 46–49, 51, 62, 135; 707/2–6
See application file for complete search history.

(56) References Cited

U.S. PATENT DOCUMENTS

| 2004/0098467 | A1* | 5/2004 | Dewey et al. ................. 709/219 |
| 2004/0151192 | A1 | 8/2004 | Trossen |
| 2004/0181604 | A1 | 9/2004 | Immonen |
| 2005/0091362 | A1* | 4/2005 | Shigeta et al. ................ 709/223 |
| 2006/0155698 | A1* | 7/2006 | Vayssiere .......................... 707/6 |
| 2006/0220095 | A1 | 10/2006 | Kim |
| 2006/0253567 | A1* | 11/2006 | Selin et al. .................... 709/224 |
| 2006/0294396 | A1* | 12/2006 | Witman et al. ............... 713/189 |
| 2007/0100960 | A1* | 5/2007 | Eichstaedt et al. ........... 709/217 |

FOREIGN PATENT DOCUMENTS

| WO | WO 01/18688 A2 | 3/2001 |
| WO | WO 2005/059676 A2 | 6/2005 |

OTHER PUBLICATIONS

Fielding, R., J. Gettys, J. Mogul, H. Frystyk, L. Masinter, P. Leach, and T. Berners-Lee, "Hypertext Transfer Protocol—HTTP/1.1", pp. 1-8, 35-37, 53, 55-56, IETF, Jun. 1999.*
Handley M., H. Schulzrinne, E. Schooler, and J. Rosenberg, "SIP: Session Initiation Protocol", pp. 1-8, IETF, Mar. 1999.*
Roach, A. B., "Session Initiation Protocol (SIP)—Specific Event Notification", IETF, Jun. 2002.*
Roach, A. B., "Session Initiation Protocol (SIP)—Specific Event Notification", RFC 3265, IETF, Jun. 2002.*
Fielding, R., J. Gettys, J. Mogul, H. Frystyk, L. Masinter, P. Leach, T. Berners-Lee, "Hypertext Transfer Protocol—HTTP/1.1", RFC 2616, IETF, Jun. 1999, pp. 1-8, 35-37, 53, 55-56, and 58.*

(Continued)

*Primary Examiner* — Patrice Winder
*Assistant Examiner* — Nam Tran
(74) *Attorney, Agent, or Firm* — Cozen O'Connor; Ian R. Blum (57) ABSTRACT

A server device configured to provide a content aggregation service. The server device comprises a first transceiver unit configured to communicate with a terminal, a second transceiver unit configured to communicate with content network sources, a memory for storing a resource list of addresses of the content network sources, and a content aggregation processor operably connected with the first and second transceiver and the memory, and configured to fetch content from the addresses of the content network sources as well as to aggregate the fetched content into a notification message to the terminal.

14 Claims, 4 Drawing Sheets

(56) References Cited

OTHER PUBLICATIONS

Rosenberg, J., "The Extensible Markup Language (XML) Configuration Access Protocol (XCAP)", IETF, Oct. 2003.*

Camarillo, G. et al., "*Subscriptions to Request-Contained Resource Lists in the Session Initiation Protocol (SIP)*", Apr. 8, 2005, pp. 1-8.

Garcia-Martin, M. et al., "*Multiple-Recipient Message Requests in the Session initiation Protocol (SIP)*", Apr. 8, 2005, pp. 1-18.

Camarillo, G. et al., "*Conference Establishment Using Request-Contained Lists in the Session Initiation Protocol (SIP)*", Apr. 8, 2004.

Camarillo, G. et al., *Framework and Security Considerations for Session Initiation Protocol (SIP) Uniform Resource Identifier (URI)—List Services*, Apr. 8, 2005, pp. 1-11.

Roach, A.B. et al., *A Session Initiation Protocol (SIP) Event Notification Extension for Resource Lists*, Dec. 15, 2004, pp. 1-43.

Camarillo, G. et al., "*Refering to Multiple Resources in the Session Initiation Protocol (SIP)*", Feb. 23, 2005, pp. 1-12.

Roach, A.B. et al., "*Session Initiation Protocol (SIP)—Specific Event Notification*", Jun. 2002, pp. 1-38.

International Search Report PCT/IB2006/053945 filed May 4, 2007.

* cited by examiner

CONTENT AGGREGATION SERVICE FOR MOBILE ENVIRONMENT

FIELD OF THE INVENTION

The present invention relates to a server for providing a content aggregation service for a mobile environment, as well as to a related method and system.

BACKGROUND ART

Really Simple Syndication (RSS) is a family of Extensible Markup Language (XML) file formats for web syndication, that is, provision of a channel of information by representing multiple resources in a single document. Web syndication is used for example by news websites and weblogs. Acronym RSS is also used to refer to Rich Site Summary and RDF Site Summary, however, meaning always the same RSS.

The RSS formats provide web content or summaries of web content together with links to the full versions of the content, and other meta-data. This information is delivered as an XML file called RSS feed, webfeed, RSS stream, or RSS channel.

RSS technology allows internet users to subscribe to websites that provide RSS feeds. Typically the content of these websites change regularly. Users are required to download a news aggregator that collects syndicated content, such as RSS and other XML feeds from the internet. The aggregator subscribes to RSS feed, and if new or updated content is available, retrieves the content. The aggregator can poll feed's Uniform Resource Locator (URL) at predetermined intervals and thereby retrieve updated content automatically. For a user, to obtain the feed items as quickly as possible, the user has to poll the URL in short enough intervals. For example, if the user wants to have the newly-arrived item available within ten minutes of its appearance, it must poll the source in an interval of less than ten minutes.

'Atom' is an XML-based document format for the syndication of web content such as weblogs and news headlines. Atom defines a feed format for representing and a protocol for editing Web resources such as weblogs, online journals and similar content. Atom framework is currently under standardization in Internet Engineering Task Force (IETF) Atom Publishing Format and Protocol (atompub) working group. The goal for the working group is to produce a single feed format and a single editing protocol.

Neither RSS nor Atom specifies a transport protocol for feeds, although hypertext transfer protocol (HTTP) is regularly used.

SIP is an application-layer control protocol for creating, modifying, and terminating sessions with one or more participants. These sessions include, for example, Internet multimedia conferences, Internet telephone calls, and multimedia distribution. SIP-specific Event Notification framework has been defined in Request for Comments (RFC) 3265 specification by Internet Engineering Task Force (IETF). SIP event framework is a SIP extension to provide an extensible framework by which SIP nodes can request notification from remote nodes indicating that certain events have occurred. The general concept is that entities in the network who are interested in the state information of other entities can subscribe to that information, and the other entities (or entities acting on their behalf) can send notifications when those states change.

Subscribers typically generate SUBSCRIBE requests and send them to notifiers to create subscriptions. Subscription is sent for a particular event and is associated with a SIP dialog. The "Event" header field of the SIP SUBSCRIBE request defines the type of state information which the subscriber is interested. Event packages define a set of state information to be reported by a notifier to a subscriber in NOTIFY requests. After receiving a new subscription, the notifier first acknowledges the subscription and then reports the current state information in a notification. If the subscription is not a 'one-shot' subscription, further notifications may be sent, for example, when the state information is changed. A subscriber acknowledges all received notifications.

Using Session Initiation Protocol (SIP) event framework for delivering RSS and Atom feeds has been described in U.S. utility application Ser. No. 11,121,539 of the same applicant filed on May 4, 2005. According to the prior patent application, polling RSS feeds very often for updates is not an optimal solution for mobile devices that have limited bandwidth and battery capacity.

Sometimes a user or application needs to perform a similar transaction with a number of remote users. For example, an instant messaging application that needs to send a particular message to many receivers needs to send the same message separately to each receiver. If a transaction to be repeated consists of a large request, or the number of recipients is high, or both, the access network of the sending party needs to carry a considerable amount of traffic. Completing all the transactions on a low-bandwidth access would require a long time.

This situation was improved by introducing Uniform Resource Identifier (URI)-List services in the network. URI-list is a list comprising one or more URIs, e.g., SIP URIs. The task of a SIP URI-list service is to receive a request that contains or references a URI-list and send a number of similar requests to the destinations, i.e., URIs, in this list. Thereby the request in transmitted only once over the low-bandwidth access interface and separate requests for each destination is created in the core network where the capacity is usually not a problem. Once the requests have been sent to the destinations, the URI-list service typically informs the sending party about their status. A URI-list service can take as an input a URI-list contained in the received SIP request itself or an external URI-list, e.g., the Request-URI is a SIP URI which is associated with a URI-list at the server. External URI-lists are typically created and managed using out-of-band mechanisms, such as XML Configuration Access Protocol (XCAP). Created URI lists may be stored in external servers, for example, in an XML Document Management Server (XDMS). Various servers, such as Instant Messaging (IM) and conference servers, can access and retrieve URI lists from the servers storing URI lists.

SUMMARY OF THE INVENTION

Therefore, it is an object of the present invention to overcome the shortcomings of the prior art.

Specifically, according to one aspect of the present invention, the above described content/feed delivery mechanism can be made more effective. According to another aspect of the present invention, content is provided using Session Initiation Protocol (SIP) events. More particularly, content is retrieved from several destinations and sent to the user in a single SIP event.

A first embodiment of the present invention is a server device configured to provide a content aggregation service, comprising a first transceiver unit configured to communicate with a terminal; a second transceiver unit configured to communicate with content network sources; a memory for storing a resource list of addresses of the content network sources; and a content aggregation processor operably connected with the first and second transceiver and the memory, and configured to fetch content from the addresses of the content network sources as well as to aggregate the fetched content into a notification message to the terminal.

The content fetching, the content aggregation and the notification message can be open for control by the terminal.

The content fetching can be controllable by the terminal by a configuration enabling to set parameter concerning at least one of a fetching interval and a content size.

The content aggregation can be controllable by the terminal by a configuration enabling to set parameter concerning at least one of an origin-based filtering and a separation into groups with related contents.

The notification message can be controllable by the terminal by a configuration enabling to set parameter concerning at least one of a notification rate, a notification message size, filter of contents, and a separation into partial notification messages.

The configuration to communicate of said first transceiver unit, and the configuration to communicate of said second transceiver unit can both involve being enabled to use the session initiation protocol as well as the hypertext transfer protocol.

The server can further comprise a translator processor operably connected with the first transceiver unit and the second transceiver unit and configured to translate messages of the session initiation protocol in the hypertext transfer protocol and vice versa.

The server can further comprise a third transceiver unit configured to retrieve the resource list from a second server.

The server can further comprise a third transceiver unit configured to retrieve the resource list from an extensible markup language configuration access protocol server.

A second embodiment of the present invention is a method of providing a content aggregation service for a communication environment, comprising creating a resource list by a terminal in a resource list server which contains a number of addresses of content network sources; sending a subscribe request from the terminal to a content aggregation server; retrieving the resource list of the resource list server by the content aggregation server; fetching contents of the content network sources by the content aggregation server according to the addresses contained in the resource list; aggregating the fetched contents into a notification message; and sending the notification message to the terminal.

The content fetching step, the content aggregation step and the notification message sending step can be controlled by the terminal.

The contents of the content network sources can be fetched by the content aggregation server also according to the protocol related to said addresses.

The content fetching step can be controlled by the terminal by setting parameter concerning at least one of a fetching interval and a content size.

The content aggregation step can be controlled by the terminal by setting parameter concerning at least one of an origin-based filtering and a separation into groups with related contents.

The notification message sending step can be controlled by the terminal by setting parameter concerning at least one of a notification rate, a notification message size, filter of contents, and a separation into partial notification messages.

The resource list creating step can involve using the hypertext transfer protocol, the subscribe request sending step can involve using the session initiation protocol, the content fetching step can involve using both the session initiation protocol as well as the hypertext transfer protocol, and the notification message sending step can involve using the session initiation protocol.

The method can further comprise translating messages of the session initiation protocol in the hypertext transfer protocol and vice versa within the content aggregation server.

The resource list creating step can involve using extensible markup language configuration access protocol.

The resource list creating step can involve using hypertext transfer protocol.

The resource list server can be a physical part of the content aggregation server so that the resource list retrieving step is performed within the content aggregation server.

The resource list creating step can be performed together with the subscribe request sending step.

A third embodiment of the present invention is a system for providing a content aggregation service for a communication environment, comprising a terminal, a resource list server, a content aggregation server, and at least one content network source, wherein the terminal is operably connected with the resource list server and configured to create a resource list in the resource list server, and the resource list is configured to contain a number of addresses of content network sources; the terminal is operably connected with the content aggregation server and configured to send a subscribe request to the content aggregation server; the content aggregation server is operably connected with the resource list server and configured to retrieve the resource list of the resource list server; the content aggregation server, is operably connected with the at least one content network source and configured to fetch contents of said at least one content network source if its address is contained in the resource list; and the content aggregation server is further configured to aggregate the fetched contents into a notification message, and to send the notification message to the terminal.

The terminal and the content aggregation server can be further configured so that the content fetching, the content aggregation and the notification message sending are controlled by the terminal.

The configuration of the terminal to control the content fetching can include to set parameter concerning at least one of a fetching interval and a content size.

The configuration of the terminal to control the content aggregation can include to set parameter concerning at least one of an origin-based filtering and a separation into groups with related contents.

The configuration of the terminal to control the notification message sending can include to set parameter concerning at least one of a notification rate, a notification message size, filter of contents, and a separation into partial notification messages.

The operable connection between the terminal and the resource list server can be configured to use the hypertext transfer protocol, the operable connection between the terminal and the content aggregation server can be configured to use the session initiation protocol, and the operable connection between the content aggregation server and the at least one content network source can be configured to use both the session initiation protocol as well as the hypertext transfer protocol.

The system can further comprise a translator processor operably connected within the content aggregation server and configured to translate messages of the session initiation protocol in the hypertext transfer protocol and vice versa.

The operable connection between the terminal and the resource list server can be configured to use the extensible markup language configuration access protocol.

The resource list server can be a physical part of the content aggregation server.

A fourth embodiment of the present invention is a computer program product comprising processor implementable instruction portions for performing all the steps of a method according to the second embodiment of the present invention and its modifications.

The computer program product can comprise a software medium storing said processor implementable instruction portions.

The computer program product can be directly loadable into the internal memory of a computer.

A fifth embodiment of the present invention is a signal carrying processor implementable instructions for controlling a computer to carry out all the steps of a method according to the second embodiment of the present invention and its modifications.

BRIEF DESCRIPTION OF THE DRAWINGS

Further aspects, features, details and advantages of the present invention will become more readily apparent from the following detailed description of preferred embodiments thereof which are to be taken in conjunction with the appended drawings, in which.

DETAILED DESCRIPTION OF THE PREFERRED EMBODIMENTS

The present invention can be advantageously applied to the ATOM/RSS feed aggregators used in conjunction with SIP. Hence, in the following, embodiments of the present invention are described by referring thereto by way of example, which is however not intended to be limiting.

According to an embodiment of the present invention, a resource list is used in order to spare bandwidth of the air interface over which a mobile terminal is connected.

Resource lists are used in applications where a client needs to send a request to multiple targets simultaneously. For example, in order to create a conference call with multiple users or to subscribe to a presence status of multiple users, the sender sends a request (e.g., INVITE, SUBSCRIBE) to the server, which explodes to all URIs in the list.

On the other hand, ATOM/RSS technologies allow an HTTP client to periodically poll an HTTP server for an XML content that includes the headlines, summaries, and pointers to the actual news.

These contents are also called feeds, which provide for the client a way to receive headlines and a short summary of recently published material in the web server. The client which reads these feeds sends an HTTP GET request to the feed server in order to obtain latest content, e.g., the news headlines. By configuring many feed addresses (HTTP URIs), a user can request information from many feed servers. This provides an excellent way for the user of getting information from multiple targets without going to the specific WEB-pages one by one.

This type of solution works fine when user has broadband connection and can send multiple requests to many targets easily.

However, in the mobile environment sending of multiple requests to many places is not feasible due to the slow connection or because of the high charges of the data usage.

Additionally, the solution also works fine when the user typically uses a single device to access his selection of feeds. However, if the user uses different devices, when the user moves to a second device, it has to configure the second device with the same selection of feeds, in order to get a single experience across multiple devices.

Additionally, in the mobile environment, there are other constraints. For instance, the number of simultaneous Packet Data Protocol (PDP) contexts might be limited in the terminal, meaning that the terminal might not establish an HTTP request (addressed to a public server in the Internet) at the same time than an active PDP context for Internet Protocol (IP) Multimedia Subsystem (IMS) signaling is established.

Last, but not least, there are no mechanisms to limit the rate of HTTP requests, merge responses (the contents of), apply filtering or throttling.

According to embodiments of the present invention, advantageous usage is made of the following situation.

The Session Initiation Protocol (SIP) provides an event package subscription and notification mechanism. For example, Atom feed event package could be defined for SIP. This way, the SIP client can subscribe to news feeds in the SIP feed server which requires support of SIP events in the feed server. SIP also provides the concept of resource lists, and resource list servers (RLS). Hence, an event package for news syndication (Atom) exists.

Thus, placed before this situation, according to an embodiment of the present invention, a user creates a resource list in a resource list server. The list contains a number of URI where to fetch or subscribe to, e.g., Atom/RSS news feeds. The list can contain one or more SIP URI, or one or more HTTP URI, or a combination of SIP, HTTP, or other URIs (e.g., SIPS and HTTPS for secure SIP or HTTP connections).

Then, the user sends a SUBSCRIBE request to the content aggregation server for the Atom event package to this list. This SUBSCRIBE request is addressed to the said resource list which is stored in the resource list server. The content aggregation server fetches the resource list from the resource list server. The content aggregation server goes one by one through all the entries in the list. Where the content aggregation server finds a SIP or SIPS URI, the server generates a SIP SUBSCRIBE for the Atom event package to that URI. Where the server finds an HTTP or HTTPS URI, the server fetches the (typically XML) document from the HTTP server.

Here, according to an advantageous modification, the SIP client can indicate in the SUBSCRIBE request or by other means (e.g., XCAP), the rate at which the aggregator should poll the RSS/Atom servers. Of course, the aggregator can contain a policy that overrides or limits the user's requests.

Anyway, when receiving content from the feed servers (SIP and/or HTTP servers) the content aggregation server includes information to the SIP NOTIFY request to the user. The server applies all notification controls which may have been defined, such as rate of notifications, filters, partial notifications, aggregation from different sources, etc.

It can be envisioned that there are other applications where the inclusion of non-SIP or non-HTTP URIs or addresses could be useful as well.

Figure 1:
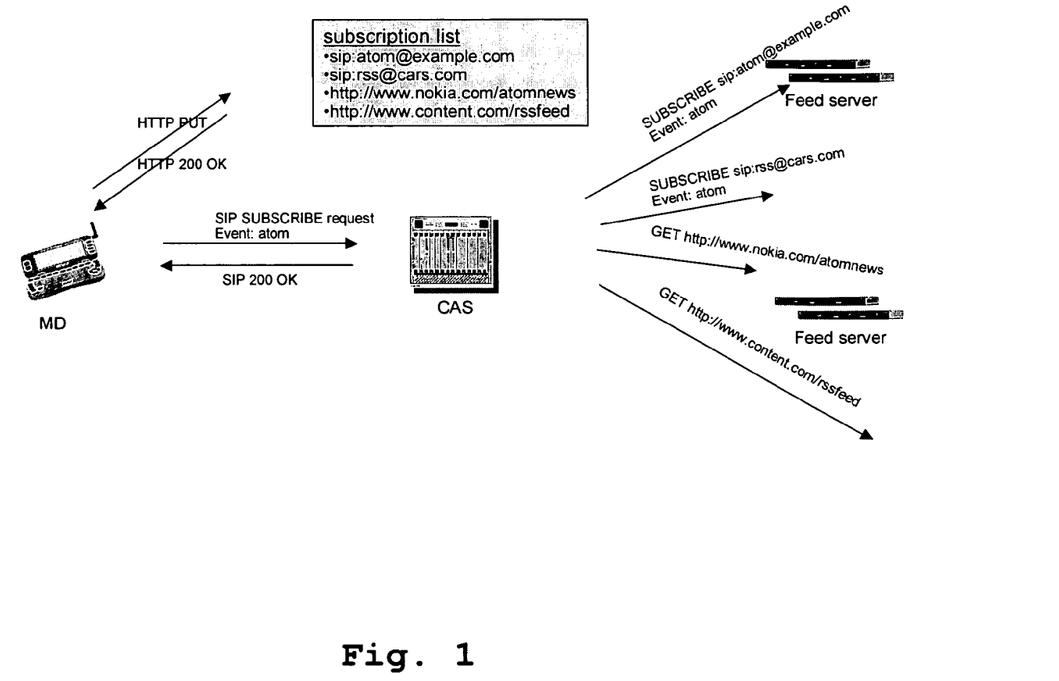
FIG. 1 shows a system for providing a content aggregation service according to an embodiment of the present invention, wherein some of the steps of a method of providing a content aggregation service according to another embodiment of the present invention are also illustrated.

FIG. 1 shows a system for providing a content aggregation service according to an embodiment of the present invention, wherein some of the steps of a method of providing a content aggregation service according to another embodiment of the present invention are also illustrated.

In FIG. 1, reference sign MD designates a mobile device (mobile terminal) such as a mobile station with a RSS/ATOM client, and reference sign CAS designates a content aggregation server (feed aggregation server).

As depicted by FIG. 1, according to a method of providing a content aggregation service corresponding to an embodiment of the present invention, firstly a user stores or modifies a resource list using HTTP PUT request. The resource list is typically stored in a resource list server. In the example in FIG. 1 the resource list server is collocated with the content aggregation server for simplicity. Then, the user subscribes to the said resource list using SIP SUBSCRIBE request to a content aggregation server that contains an event (e.g. "atom"), and optionally a polling interval and if the user wants to get notified about new content. The SIP SUBSCRIBE request may contain any filters or a throttle that limit the amount of information transmitted to the mobile device MD. Next, the content aggregation server contacts HTTP servers and SIP servers depending on the resource list entries, i.e., depending on the URIs included in the list. It is to be noted that according to the current embodiment of the present invention, both non-SIP URI and non-SIP requests may be used.

Figure 2:
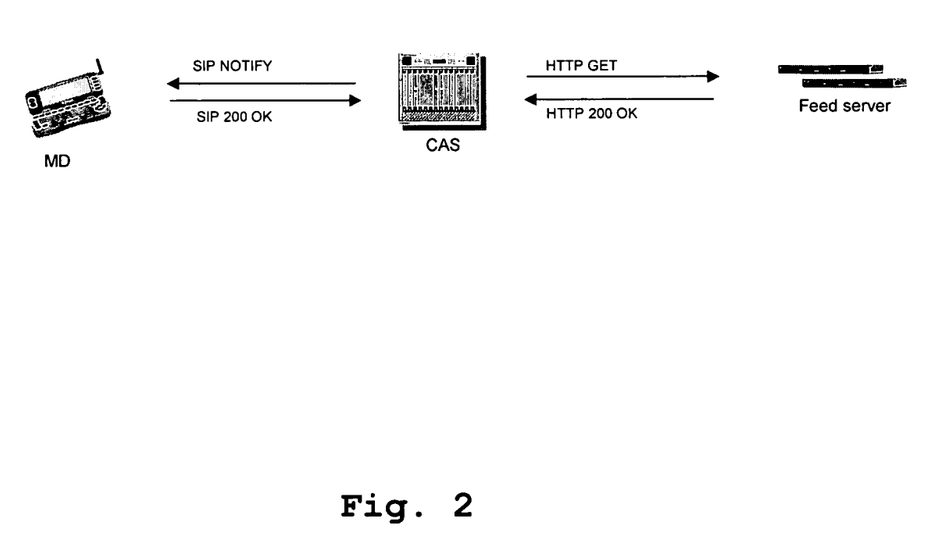
FIG. 2 shows a part of the system according to FIG. 1, wherein further steps of the method of providing a content aggregation service according to another embodiment of the present invention are illustrated.

Thereafter, as shown in FIG. 2, the content aggregation server sends one or more SIP NOTIFY requests to the user when receiving the content from the actual feed servers.

Figure 3:
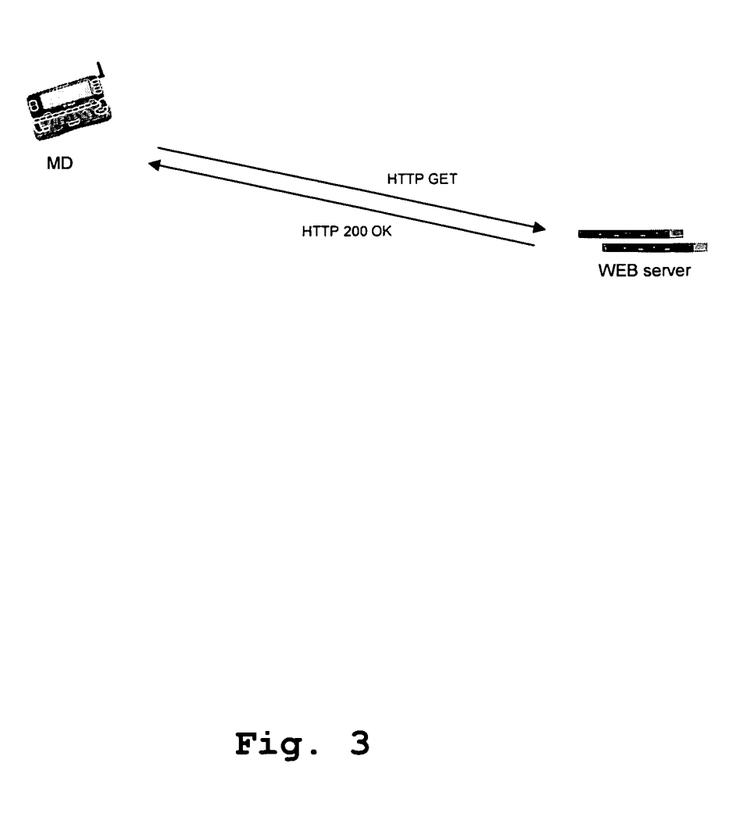
FIG. 3 shows a mobile terminal and a web server according to a further development of the method of providing a content aggregation service according to another embodiment of the present invention.

The received feed typically contains a headline or summary of the whole content, along with a URI where the whole content can be fetched. So finally, as depicted by FIG. 3, if the user is interested in seeing the whole content, the user goes to the actual web-page by sending a request to the learnt URI where the whole content is stored.

To modify the resource list in the network, according to an embodiment of the present invention, a client may use, e.g., XCAP or a HTTP through a regular web page. As stated above, the user can include both SIP/SIPS URIs, HTTP/HTTPS URI, or any other suitable type of URI, contrary to the prior art, and the client can also specify attributes related to the feed server URI, for example, a HTTP GET polling interval from the feed server, and feed size attributes (e.g., filters or throttle) in order to prevent too much content to be pushed over the air interface. As described above, based on the user action, the client sends SIP SUBSCRIBE request to subscribe to the resource list for the atom event, and the content aggregation server which, according to an embodiment of the present invention, may be identical to the resource list server, sends SIP SUBSCRIBE requests to the SIP/SIPS URIs defined in the resource list and HTTP GET requests to the HTTP/HTTPS URIs. The content aggregation server receives feed content from the feed server, according to an embodiment of the present invention, typically in a SIP NOTIFY request or in the 200 OK response for an HTTP GET request. The content aggregation server includes that received content into a SIP NOTIFY request and sends it to the mobile device. Furthermore, if appropriate, an embodiment of the present invention includes that rate limitations keep the content in the server for a while. Then, as described above, if the user is interested in seeing the whole content, the mobile client uses a browser to invoke the appropriate protocol (e.g., SIP, SIPS, HTTP, HTTPS) for the whole content URI and contacts an actual server to retrieve such whole content.

An advantage of certain embodiments of the present invention is to use all the benefits of the SIP event/notify framework, such as authentication and authorization frameworks, event throttling, filters, etc., and extend it to contact non-SIP end-points and servers.

A particular advantage of certain embodiments of the present invention is presently seen to apply them for the use for feed reading purposes, which are not yet spread to the mobile domain.

Figure 4:
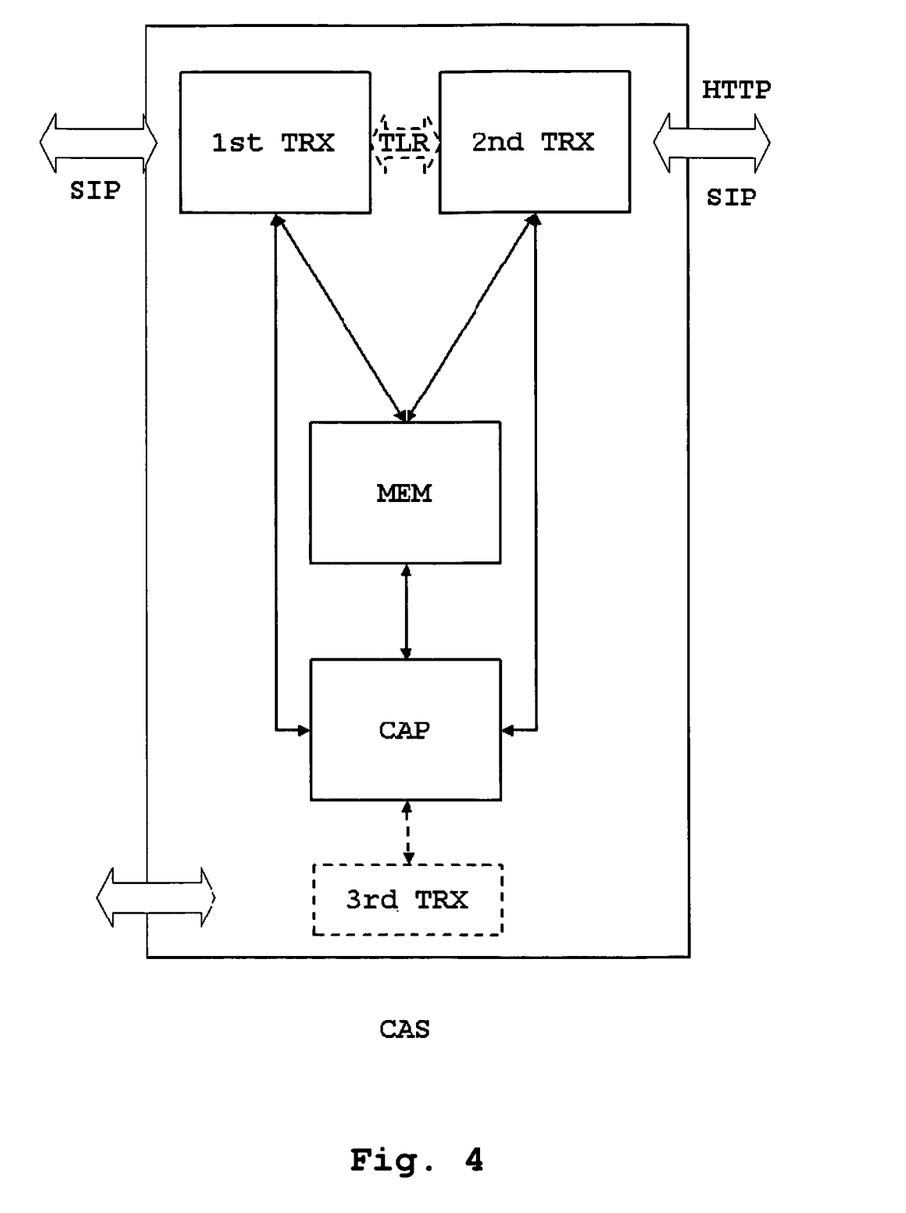
FIG. 4 shows a server device for providing a content aggregation service according to still another embodiment of the present invention.

According to another embodiment of the present invention, there is a server device configured to provide a content aggregation service as illustrated in FIG. 4. The server device comprises a first transceiver unit ($1^{st}$ TRX) configured to communicate with a mobile terminal, e.g., via SIP, as described above, and a second transceiver unit ($2^{nd}$ TRX) configured to communicate with content network sources, e.g., via HTTP and SIP. The server device according to FIG. 4 further comprises a memory (MEM) for storing a resource list of addresses of the content network sources, and a content aggregation processor (CAP) operably connected with the first and second transceiver and the memory, and configured to fetch content from the addresses of the content network sources as well as to aggregate the fetched content into a notification message to the mobile terminal. Further operably connections are illustrated in FIG. 4 by arrows.

As described above, the content fetching, the content aggregation and the notification message shall be open for control by the mobile terminal.

A further modification can be a translator processor (TLR) which can be operably connected with the first transceiver unit ($1^{st}$ TRX) and the second transceiver unit ($2^{nd}$ TRX) and configured to translate messages of the session initiation protocol in the hypertext transfer protocol and vice versa.

A still further modification can be a third transceiver unit ($3^{rd}$ TRX) configured to retrieve the resource list from an extensible markup language document management server.

What is described above is inter alia a server device configured to provide a content aggregation service, comprising a first transceiver unit configured to communicate with a terminal, a second transceiver unit configured to communicate with content network sources, a memory for storing a resource list of addresses of the content network sources, and a content aggregation processor operably connected with the first and second transceiver and the memory, and configured to fetch content from the addresses of the content network sources as well as to aggregate the fetched content into a notification message to the terminal.

Although it has been described above what is presently considered to be preferred embodiments of the present invention, it is fully apparent to those who are skilled in the art that various modifications of and combinations among the above described preferred embodiments are possible unless otherwise implied without deviating from the spirit and scope of the present invention as defined by the appended claims.

For example, a person skilled in the art can easily foresee the addition of new transceiver units (TRX) and translators (TLR) to the content aggregation server when new or existing protocols are found suitable for feed retrieval.

The invention claimed is:
1. An apparatus, comprising:
at least one processor; and
at least one memory, wherein the at least one processor and the at least one memory are configured to provide operations comprising:

receiving, at a content aggregation server, a session initiation protocol subscribe message from a mobile terminal, wherein the session initiation protocol subscribe message comprises a session initiation protocol event package to subscribe to at least one of a plurality of content network sources included on resource list at a resource list server, wherein the resource list includes at least one of a plurality of session initiation protocol uniform resource identifiers and is configured before the receiving to include at least one of the plurality of content network sources, wherein the resource list is fetched based on the received session initiation protocol subscribe message;

sending, by the content aggregation server, the session initiation protocol subscribe message to the at least one of the plurality of content network sources listed in the resource list and addressed by at least one of the plurality of session initiation protocol uniform resource identifiers, wherein the session initiation protocol subscribe message further comprises a registration with the at least one of the plurality of content network sources;

fetching, by the content aggregation server, content of the at least one of the plurality of content network sources by sending a session initiation protocol event package subscription to the at least one of the plurality of content network sources; and aggregating, by the content aggregation server, the fetched content into the session initiation protocol notify message sent to the mobile terminal.

2. The apparatus according to claim 1, wherein the content fetching, the content aggregation, and the notification message are open for control by the mobile terminal, wherein the session initiation protocol subscribe message further comprises a parameter to control a rate at which the content aggregation server polls the at least one of the plurality of content network sources.

3. The apparatus according to claim 1, wherein the content fetching is controllable by the mobile terminal by a configuration enabling to set parameter concerning at least one of a fetching interval and a content size.

4. The apparatus according to claim 1, wherein the content aggregation server is controllable by the mobile terminal by a configuration enabling to set parameter concerning at least one of an origin-based filtering and a separation into groups with related content.

5. The apparatus according to claim 1, wherein the session initiation protocol notify message is controllable by the mobile terminal by a configuration enabling to set parameter concerning at least one of a notification rate, a notification message size, filter of contents, and a separation into partial session initiation protocol notify messages.

6. The apparatus according to claim 5, further comprising:
a translator, at the content aggregation server, operably connected with the transceiver and another transceiver and configured to translate a message configured in accordance with the session initiation protocol into another message configured in accordance with the hypertext transfer protocol.

7. The apparatus according to claim 1, further comprising:
a resource list transceiver unit configured to retrieve the resource list from a second server.

8. The apparatus according to claim 1, further comprising:
a resource list transceiver unit configured to retrieve the resource list from an extensible markup language configuration access protocol server.

9. A method, comprising:
receiving, at a content aggregation server, a session initiation protocol subscribe message from a mobile terminal, wherein the session initiation protocol subscribe message comprises a session initiation protocol event package to subscribe to at least one of a plurality of content network sources included on a resource list at a resource list server, wherein the resource list includes at least one of a plurality of session initiation protocol uniform resource identifiers and is configured before the receiving to include at least one of the plurality of content network sources, wherein the resource list is fetched based on the received session initiation protocol subscribe message;

sending, by the content aggregation server, the session initiation protocol subscribe message to the at least one of the plurality of content network sources listed in the resource list and addressed by at least one of the plurality of session initiation protocol uniform resource identifiers, the session initiation protocol subscribe message further comprises a registration with the at least one of the plurality of content network sources;

fetching, by the content aggregation server, content of the at least one of the plurality of content network sources by sending a session initiation protocol event package subscription to the at least one of the plurality of content network sources; and aggregating, by the content aggregation server, the fetched content into the session initiation protocol notify message sent to the mobile terminal.

10. The method according to claim 9, further comprising:
controlling the fetching of the content, and aggregating the fetched content using the mobile terminal.

11. The method according to claim 9, further comprising:
setting parameter concerning at least one of a fetching interval and a content size to control fetching the content of the content network sources by the mobile terminal.

12. The method according to claim 9, further comprising:
setting parameter concerning at least one of an origin-based filtering and a separation into groups with related content to control the fetching of the content of the content network sources by the mobile terminal.

13. The method according to claim 9, further comprising:
setting a parameter concerning at least one of a notification rate, a notification message size, filter of contents, and a separation into partial session initiation protocol notify messages to control the sending of the session initiation protocol notify message by the mobile terminal.

14. The method according to claim 9, further comprising:
translating, at the content aggregation server, a message configured in accordance with the session initiation protocol into another message configured in accordance with hypertext transfer protocol.

* * * * *